United States Patent [19]

Moore et al.

[11] Patent Number: 5,525,019

[45] Date of Patent: Jun. 11, 1996

[54] REAR PLATFORM LIFT

[75] Inventors: Scott W. Moore; Jean-Francois Villaneau; John S. Harlan, all of Salinas; Raymond L. Hickman, Gilroy, all of Calif.

[73] Assignee: Lantis Corporation, Salinas, Calif.

[21] Appl. No.: 344,110

[22] Filed: Nov. 23, 1994

[51] Int. Cl.$^6$ ..................... B60P 1/02
[52] U.S. Cl. ............. 414/347; 414/495; 187/269; 254/122
[58] Field of Search ................. 414/343, 347, 414/356, 659, 660, 495; 244/137.1; 187/211, 269; 254/122, 9 C

[56] References Cited

U.S. PATENT DOCUMENTS

| | | | |
|---|---|---|---|
| 682,932 | 9/1901 | Haltom | 254/122 X |
| 3,110,476 | 11/1963 | Farris | 187/269 X |
| 3,666,127 | 5/1972 | Guyaux | 414/347 X |
| 4,010,826 | 3/1977 | Jones | 414/495 |
| 4,194,723 | 3/1980 | Grove et al. | 254/122 X |
| 4,221,280 | 9/1980 | Richards | 187/269 |
| 4,302,050 | 11/1981 | Jones | 254/9 C X |
| 4,701,097 | 10/1987 | Sturtz | 414/495 |
| 4,741,576 | 5/1988 | Jones | 254/9 C X |
| 4,901,980 | 2/1990 | Hansen | 254/9 C |
| 5,396,977 | 3/1995 | Lantis et al. | 198/371 |

FOREIGN PATENT DOCUMENTS 2113175  8/1983  United Kingdom ............ 414/495

OTHER PUBLICATIONS

Lantis Corporation Model TLC 818 Container Pallet loader brochure, 8 pages; Lantis Corp. 1215 Hansen Sr., Salinas, CA date unknown.

"CAT" hydraulic arrangement picture, 1 page, from Jul. 12, 1994 article in the Wall Street Journal.

*Primary Examiner*—Karen B. Merritt
*Assistant Examiner*—Stephen Gordon
*Attorney, Agent, or Firm*—Flehr, Hohbach, Test, Albritton & Herbert

[57] ABSTRACT

A hydraulic rear platform lift for an aircraft loader provides for an increased height by providing a pair of lifting levers actuated by a hydraulic cylinder-piston which extends into cutout space of a forward support frame and mates with the scissor type lifting beams of a forward lifting platform. The lifting mechanism generally consists of a chicken leg lever and tension bar with the actuating force provided by a cylinder-piston connected between the chicken leg lever and the other end of the tension bar. For even greater lifting heights, one end of the tension bar may be placed on the leg of the rear scissor beams with appropriate cutouts being provided in the rear support frame and rear elevatable platform.

6 Claims, 5 Drawing Sheets

REAR PLATFORM LIFT

The present invention is directed to an aircraft loader having independent forward and rear elevator platforms, and more specifically to the hydraulic lift for the rear platform.

BACKGROUND OF THE INVENTION

U.S. Pat. No. 4,701,097 shows an aircraft loader which has front and rear deck platforms supported on scissor type beams or supports. As stated in that patent the airline industry has many types of aircraft designs and sizes and each aircraft's design may require a slightly different loading height for its cargo door. As the loading height of airplanes increase, it is necessary to increase the height to which the elevated platforms are raised. Such lifting mechanisms include hydraulic pistons with levers or with chain devices.

OBJECT AND SUMMARY OF THE INVENTION

It is a general object of the present invention to provide an improved rear platform lift.

In accordance with the above object, there is provided an aircraft loader having a pair of independent elevator platforms including a forward platform for adjusting to an aircraft cargo door and a contiguous rear platform for receiving pallet type loads and transferring them to the forward platform. Both of the platforms have underlying scissor beams mounted on respective support frames which form a mobile vehicle and which allow the platforms to be elevated and lowered to the support frames within individual vertical spaces. The support frames for both platforms each have a pair of tracks in which the ends of the scissor beams slide during elevating and lowering maneuvers, the other ends of the scissor beams being pivotally fixed to such respective support frames. The platforms also include similar tracks where ends of the scissor beams may slide and fixed pivot points for the scissor beams whereby elevating and lowering within individual vertical spaces is provided for each platform. The aircraft loader includes improved hydraulic lifting means comprising hydraulic lifting means for the rear platform including a plurality of lever arms and a hydraulic actuating piston for actuating said lever arms to lower and raise the rear platform. The lever arms in the lowered position of the rear platform extend into cutouts in the forward support frame to allow the forward platform to be lowered to a predetermined minimum lowered position above a roadway without interference from such lever arms of the rear platform.

BRIEF DESCRIPTION OF THE PREFERRED EMBODIMENTS

Figure 1:
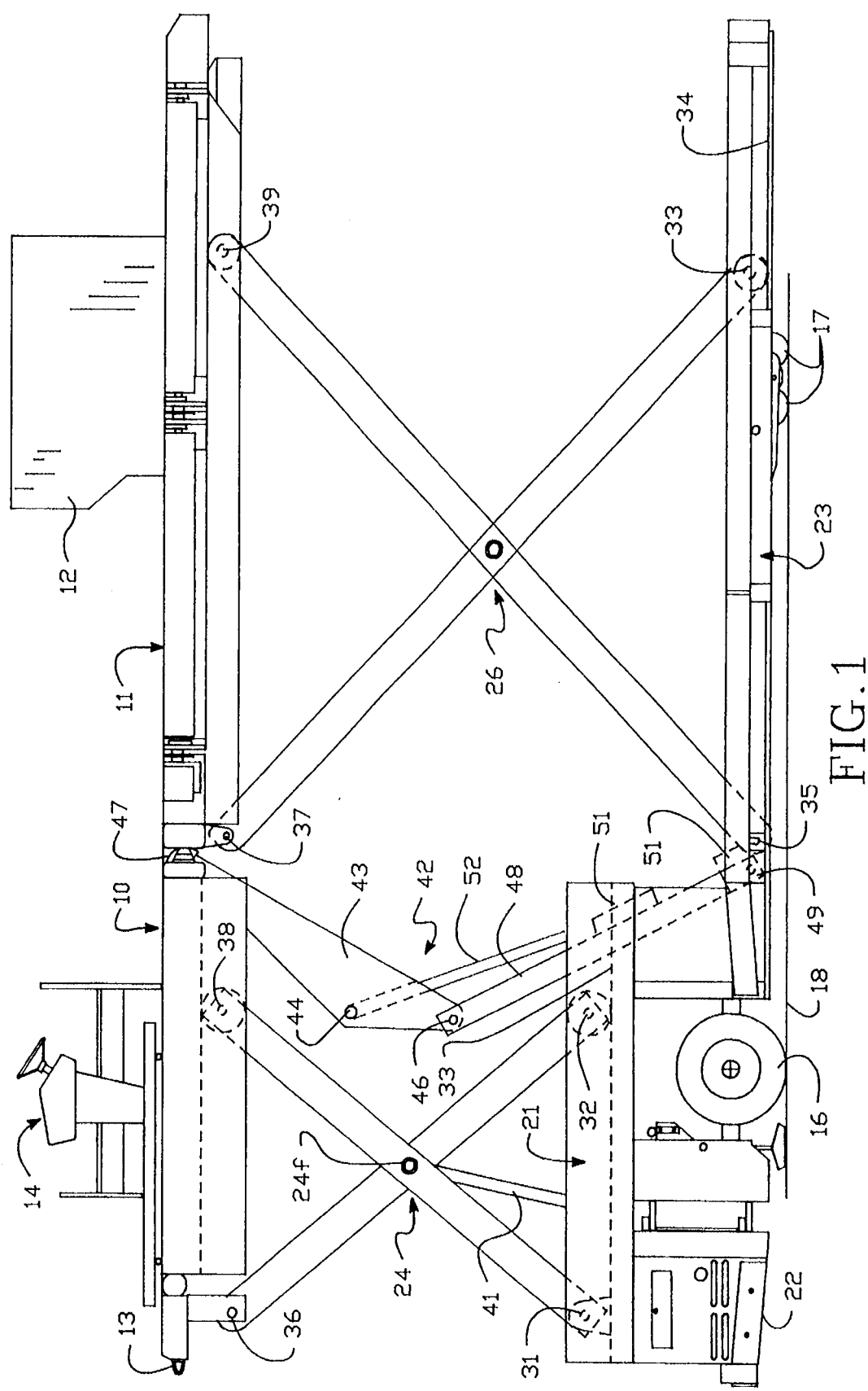
FIG. 1 is a side elevational view of one embodiment of the invention.

FIG. 1 illustrates one embodiment of the aircraft loader of the present invention which includes a forward platform 10 and a rear platform 11 which has placed on it a pallet type load 12. The forward platform 10 has a leading edge 13 which would be normally positioned at the cargo door of an aircraft (not shown). An operator's console 14 has controls both for driving the mobile aircraft loader (which includes front wheels 16 and the rear wheels 17 which of course, are shown resting on the roadway 18 and in addition, the console 14 has controls for controlling conveyor means; for example, in the form of rollers to selectively rotate and translate pallet 12 from the rear conveyor to the front platform 10 and onto the aircraft. One type of conveyor utilizing rollers and its associated control system is disclosed in a pending patent application Ser. No. 08/134,752, filed Oct. 12, 1993, now U.S. Pat. No. 5,396,977, and assigned to the present assignee.

Continuing with the general aspects of the aircraft loader, as is well known in the art, the wheels 16 are attached to a forward support frame 21 which also includes the motor 22 which provides both hydraulic fluid pressure for the hydraulic piston which supplies the lifting action and also for the motion of the loader itself on the roadway 18. A rear support frame 23, which is integrally connected to the front support frame 21, carries the rear wheels 17. Support frames 21 and 23 respectively support pairs of scissor beams 24 (for the forward platform) and 26 (for the rear platform). On the support frame 21, one end of the scissor beam pairs is pivotally mounted at 31 and the other roller end 32 rolls along a track 33 in a manner well known in the art. Similarly for the scissor beam pairs 26 at the lower end are pivotally mounted at 35 to the rear platform support frame 23 and its roller end 33 rolls in track 34. And then, as illustrated, the top ends of the scissor beams are similarly pivoted at 36 and 37 and they roll at 38 and 39 on the respective forward and rear platforms 10 and 11. Finally the forward scissor beams 24 are actuated by a piston-cylinder assembly 41. From inspection of the scissor beam action, it is obvious that the platforms 10 and 11 are independently raised and lowered within their individual vertical spaces. All of the foregoing is basically shown in the above mentioned U.S. Pat. No. 4,701,097.

In order to raise and lower the platform 11 to a sufficient height (for example, 180 inches) a hydraulic lifting system 42 is provided and includes a chicken leg lever 43 (so named because the point of actuating force 44 is displaced from a line between its two end points 46 and 47) and a tension lever 48. The levers 43 and 48 are pivotally connected together at 46 at the substantial midpoint of the resultant lever system. Pivot point 47 is fixed to platform 11 (adjacent scissor beam pivot 37) and pivot point 49 of the tension lever 48 is pivotally mounted on support frame 23 adjacent the pivot point 35 of one of the scissor beams.

To actuate this lever system there is an actuating cylinder 51 and its associated piston and piston rod 52 which is attached to the chicken leg lever 43 at pivot point 44. Cylinder 51 itself is pivotally attached at the point 49, the same point as the tension lever 48.

Because of the height to which the rear platform 11 must be raised, the lever system 42 must be located at an offset from the scissor beam pairs 26 for the platform 11. In other words they cannot interfere with the rear platform 11 when it is lowered to a predetermined minimum height above roadway 18. For example, this may be typically 20 inches. This height is determined by the capability of the airport loading equipment loading the pallets 12 on the rear platform. Additionally the system 42, because of the weight it must raise, typically in the present embodiment would include a pair of cylinders 51 and a pair of pistons and rods 52 to provide reliability and sufficient lifting force. It is of course obvious that to locate the lever arms and the lifting system 42 at the opposite edge of platform 11 would interfere with the loading of the platform. Finally the lever system 42 cannot interfere with the scissor beams 24 on the forward platform either during movement or at a predetermined minimum lowered position above roadway 18 which typically might be 68 inches. The height of the lowered platform must accommodate smaller aircraft which have a lower loading height.

Figure 2:
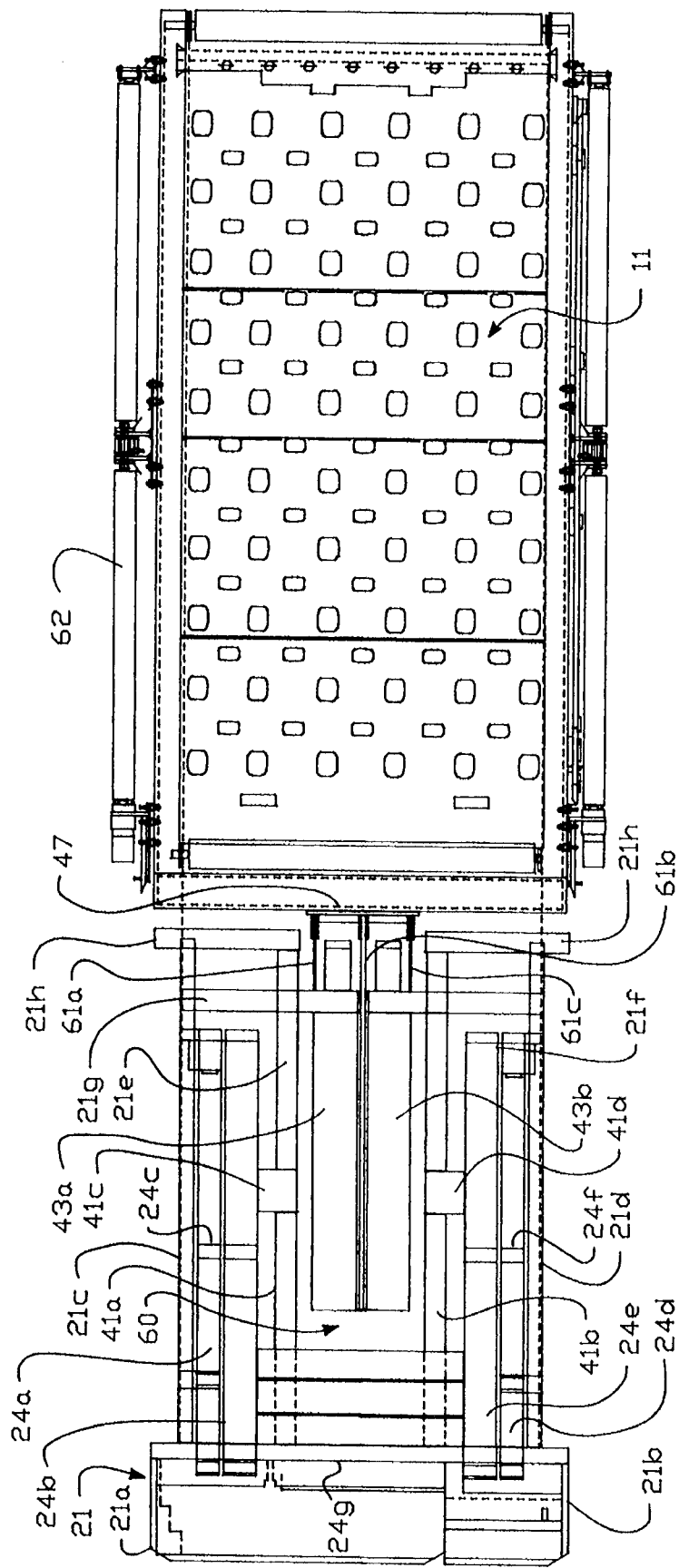
FIG. 2 is a top view of FIG. 1 with portions cut away.

FIG. 2 illustrates the cutout 60 in the front support frame 21 which accommodates the hydraulic lifting system 42 both in its raised elevated position shown in FIG. 1 and when it is lowered. The cutout accommodates the chicken leg levers 43 which are effectively a pair of levers, 43*a* and 43*b*, and which include the extensions 61*a*, *b* and *c* to the pivot point mounting 47 on the platform 11. The bridge platform is not shown but only the structural members of the support frame 21 which are lettered 21 with the subscripts a through h. This includes end portions 21*a* and 21*b*, the side rails 21*c*, 21*d*, interior rails 21*e* and 21*f* and longitudinal rails 21*g* and 21*h*.

Finally the scissor beam pairs 24 are illustrated in their folded position including its lifting cylinders and this includes the cylinder pair 41*a* and *b* pivoted at 41*c* and *d*, respectively, right hand scissor beams 24*a* and 24*b* with center pivot 24*c* and left hand scissor beams 24*d* and 24*e* with center pivot 24*f* (see FIG. 1 also). The left and right hand scissor beams are connected by three cross connectors 24*g*. The foregoing also eliminates interference in intermediate positions.

With respect to the rear platform 11, the rollers 62, as shown, are more fully discussed in the above copending application.

Figure 3:
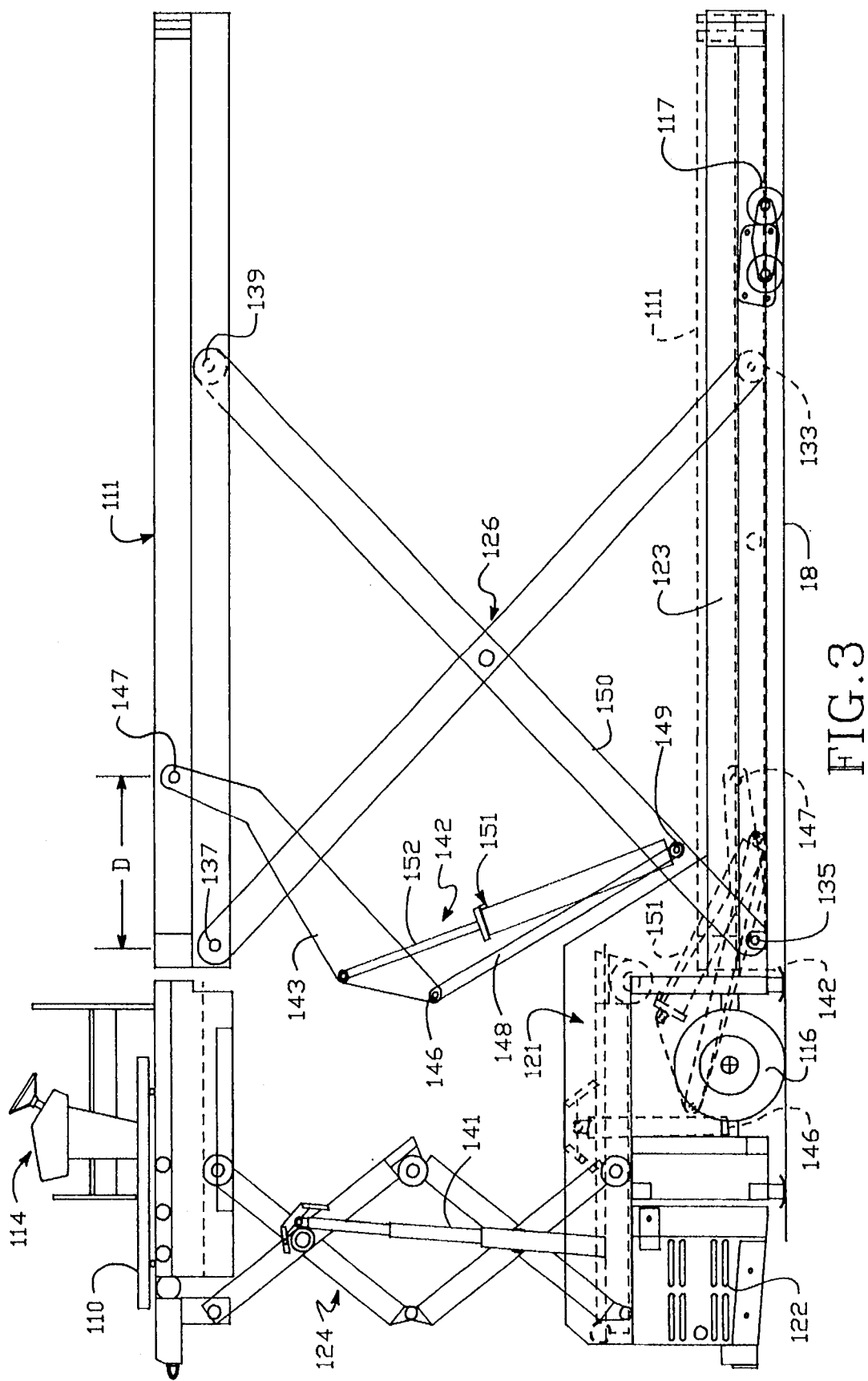
FIG. 3 is a side elevational view of another embodiment of the invention.

FIG. 3 illustrates another embodiment of the invention which is similar to FIG. 1 but includes a forward platform 110 and a rear platform 111 which may be raised above roadway 18 a greater height such as, for example, 228 inches. The lowered heights of platforms 110 and 111 are similar as explained above which are 68 and 20 inches, respectively. To provide for the greater lift height, the scissor type beam pairs for the forward platform 110 includes two sets of X type scissors 124. These are lifted by the cylinder-piston 141. Then with respect to the scissor beam pairs 126 for the rear platform 111, these are longer in length than those illustrated in FIG. 1. All of the scissor beams are both pivoted on their respective platforms 110 and 111, and support frames 121 and 123, on one end with the other ends 133 and 139 sliding in a track.

Other well known aspects of the aircraft loader of FIG. 3 include the control unit 114, the front engine unit 122 and the front and rear wheels 116 and 117.

Hydraulic lifting mechanism 142 of the embodiment in FIG. 3, which provides a greater height, includes both a chicken leg type lever 143, a tension bar 148, and a cylinder-piston unit 151, 152. But although it has a similar pivoted midpoint 146, the other end of the chicken leg lever 143 is pivoted at the point 147 on rear platform 111 at a point displaced from the pivotal mounting 137 of the adjacent scissor beam. And similarly at the other end of the hydraulic lever arrangement 142, the cylinder 152 and tension bar are pivoted together at a point 149, on the scissor beam 150 at a location relatively above said rear frame support 123. Thus this pivot point 149 is spaced from the lower pivot point 135 of the scissor beam 150. From an inspection of FIG. 3, it is obvious that the displacement D of pivot point 147, that is, the end of the chicken leg lever 143 from the scissor beam 147, minimizes the incursion of pivot point 146 which is the midpoint of the lifting arrangement 142 so as not to interfere with the multiple scissor beams 124 of the forward lift. And such incursion would be relatively greater than that illustrated in FIG. 1 because of the longer lever length required. Concomitantly the lever length of, for example, tension lever 148 is reduced because of its mounting on an upper portion of scissor beam 150 rather than the pivot beam 135.

Figure 5:
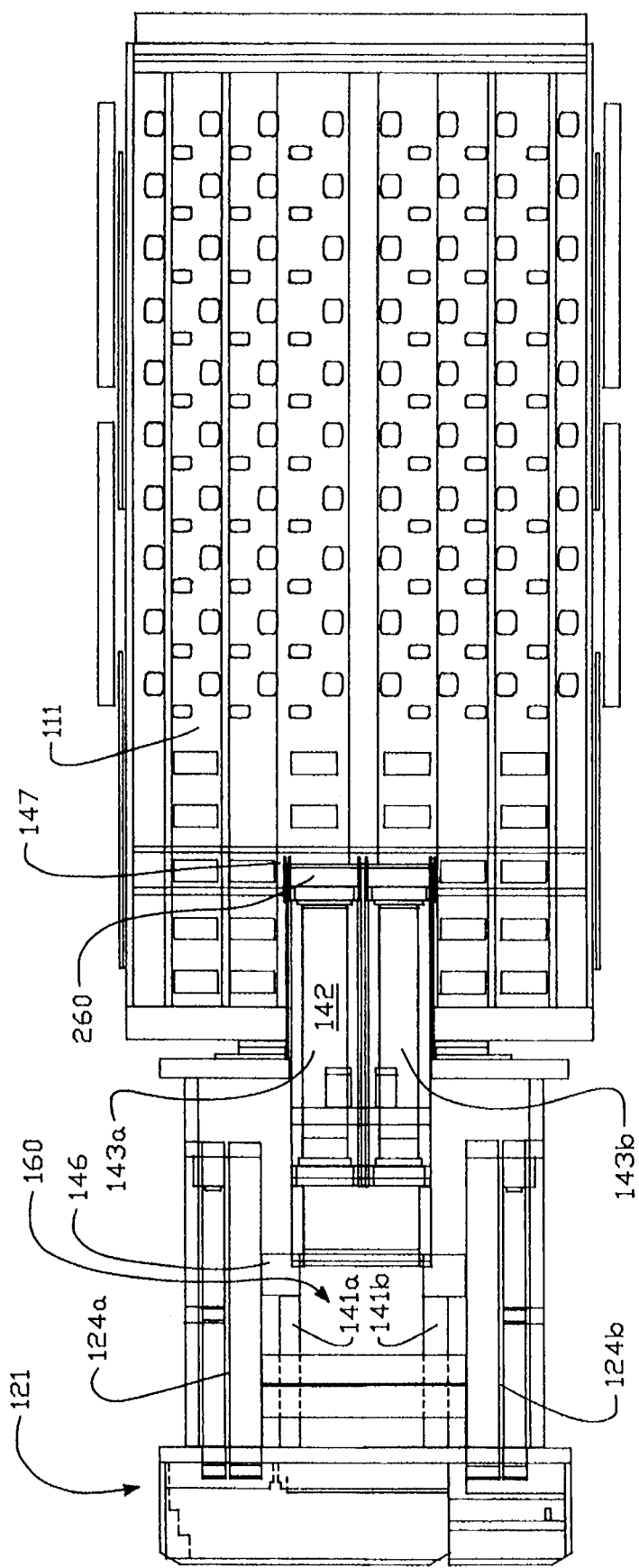
FIG. 5 is a top view of FIG. 3 with portions cut away.

However to accommodate in a lowered position the lifting lever arrangement 142, as illustrated in FIG. 5 in addition to a cutout 160 in the forward support frame 121, it is also necessary to have a cutout 260 both in the rear platform 111 and the rear support frame 123. This is better illustrated in FIG. 3 where the dashed outline of platform 111 when it is lowered is shown along with the dashed outline of the levers of hydraulic actuating system 142. Accommodation must also be made for the midpoint pivot 146 by dropping or eliminating the center of the axle on wheel 116.

Figure 4:
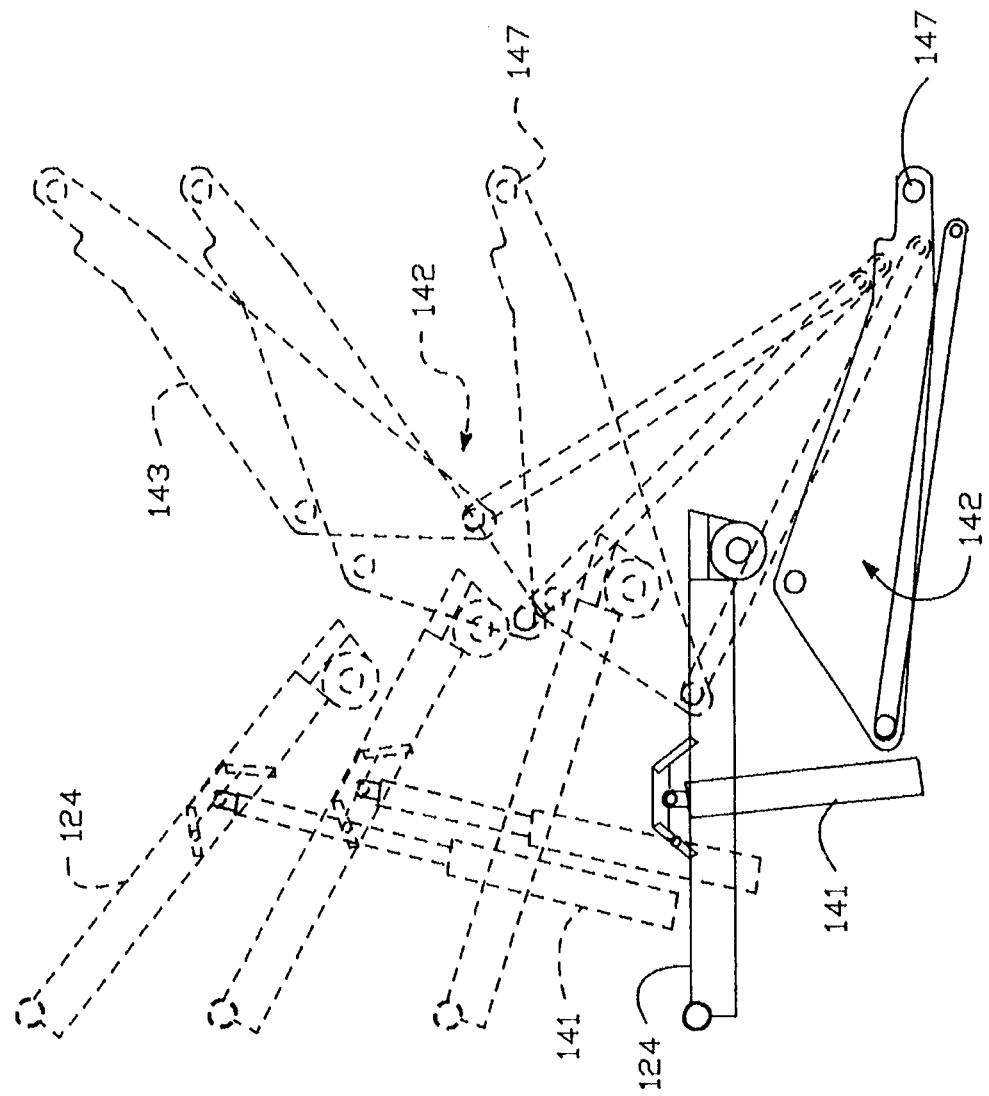
FIG. 4 is more detailed view of a portion of FIG. 3 showing portions of the loader in different positions in dashed outline.

FIG. 4 is a sequence chart of the motion of both the lifting lever arrangement 142 and how it interfaces with the scissor beams 124 and the scissor beam cylinder-piston arrangement 141. It is seen that in some positions the rear platform must be lowered a greater distance than the forward platform in order to avoid interference.

Finally referring to FIG. 5, which shows the lowered position of the lever arrangement 142 in the cutouts 160 and 260, again as in the case of FIG. 3, there are a pair of chicken leg levers 143*a* and 143*b* with their associated pistons and cylinders. The pivot point 147 on platform 111, as illustrated, is situated within the cutouts 260 of both rear platform 111 and rear support frame 123 (see also FIG. 3). Nested in forward support frame 121 are the scissor beam pairs 124*a* and 124*b* and their respective cylinder-pistons 141*a* and 141*b*. Finally pivot point 146, which is a midpoint of the lever arrangement 142, is illustrated.

Thus an improved rear platform lift for an aircraft loader is provided which allows for increased heights. More specifically the location of the lifting mechanism having at least a portion forward of the rear platform allows for a greatly increased height. And moreover a variation in these heights is possible by merely adjusting the stroke of the hydraulic cylinders and the length and attach points of the lifting members. Having the two lifting cylinders close together minimizes the eccentric loading in the event that one cylinder fails as well as providing a redundancy for safety reasons. Another advantage of the dual cylinder design in combination with the lifting mechanism being in the center of the platform (as opposed to location at each side of the platform as was true of older lifts of the grasshopper type) is that the center location has more flexibility in the design of the transfer conveyor system in maintaining either the low 20 inch down height or the lift height.

Finally other advantages of the present invention are:

(1) a centralized lift and lever system keeps commonality in the chassis between loaders of different types built for either narrow or wide configurations. In older systems where the lift is located on the outside of the platform, for example, such as a chain over post system, the commonality of the chassis is lost.

(2) with a major portion of the lifting system levers located forward of the rear platform instead of totally underneath such platform, periodic safety inspection of the lift components is more readily accomplished. In addition with the lift levers in their forward location, this becomes a safe routing means for the hydraulic hoses while still obtaining access to the rear platform. Moreover bending stress on the hoses is minimized because the pivot joints of the lift members permit generous loops in the routing.

What is claimed is:

1. In an aircraft loader having a pair of independent elevator platforms including a forward platform for adjusting to an aircraft cargo door and a contiguous rear platform for receiving pallet type loads and transferring them to the forward platform, both of said platforms having underlying scissor beams mounted on respective support frames, which form a mobile vehicle and which allow said platforms to be elevated and lowered to said support frames within individual vertical spaces, said support frames for both said platforms each having a pair of tracks in which ends of said scissor beams may slide during elevating and lowering maneuvers, other ends of the scissor beams being pivotally fixed to such respective support frames, said platforms also including a pair of tracks where ends opposite to the fixed ends of the scissor beams may slide and also fixed pivot points for said scissor beams whereby elevating and lowering within individual vertical spaces is provided for each platform, said aircraft loader including improved hydraulic lifting means for said rear platform comprising:

said hydraulic lifting means for said rear platform including a plurality of lever arms connected between said rear platform and its support frame and a hydraulically actuated cylinder and piston for actuating said lever arms to lower and raise said rear platform, said lever arms in a lowered position of said rear platform extending into cutouts in said forward platform support frame to allow said forward platform to be lowered to a predetermined minimum lowered position above a roadway without interference from such lever arms.

2. An aircraft loader as in claim 1 where said rear platform includes cutouts for said levers of said hydraulic lifting means to allow said rear platform to be lowered to said predetermined minimum height above a roadway.

3. An aircraft loader as in claim 2 wherein said predetermined minimum height of said rear platform is less than said lowered position of said forward platform, said forward support frame including motor means for providing both motion and hydraulic pressure for said aircraft loader.

4. An aircraft loader as in claim 1 where said plurality of lever arms of said hydraulic lifting means for said rear platform include a chicken leg lever, a tension lever, and said hydraulically actuated cylinder and piston having two ends with one end pivoted on said chicken leg lever and the other end pivoted with said tension lever.

5. An aircraft loader as in claim 4 where the tension lever and chicken leg lever are pivoted together at one of their ends and other ends of the respective levers are pivotally mounted to the said support frame for said rear platform and said rear platform.

6. An aircraft loader as in claim 4 where said chicken leg lever and tension lever are pivotally connected together at one of their ends, another end of said chicken leg lever being pivoted to said rear platform at a location different than said fixed pivot points of said scissor beams, and another end of said tension lever being pivotally mounted on the rear platform scissor beam, which is pivotally connected to said rear support frame, at a location above said rear support frame.

* * * * *